United States Patent [19]

Ido et al.

[11] 4,278,452

[45] Jul. 14, 1981

[54] CYCLONE SEPARATOR

[75] Inventors: Kazuo Ido, Hino; Yukio Sogo, Atsugi; Kozo Taneda, Kodaira; Katzuji Sakai, Chiba; Yoichiro Sato, Matsudo, all of Japan

[73] Assignee: Snow Brand Milk Products Co., Ltd., Hokkaido, Japan

[21] Appl. No.: 68,953

[22] Filed: Aug. 23, 1979

[30] Foreign Application Priority Data

Aug. 28, 1978 [JP] Japan .......................... 53-117527[U]
Sep. 29, 1978 [JP] Japan .......................... 53-134551[U]

[51] Int. Cl.$^3$ .............................................. B01D 45/12

[52] U.S. Cl. ........................................ 55/261; 55/339; 55/392; 55/414; 55/424; 55/459 R

[58] Field of Search ................ 55/261, 339, 392, 413, 55/414, 424, 459 R; 209/144

[56] References Cited

U.S. PATENT DOCUMENTS

| | | | |
|---|---|---|---|
| 1,464,113 | 8/1923 | Ryding | 55/261 |
| 2,039,115 | 4/1936 | Reif | 55/340 |
| 2,153,270 | 4/1939 | Osgood | 55/339 |
| 2,252,581 | 8/1941 | Saint-Jacques | 55/459 R |
| 2,414,641 | 1/1947 | French | 55/426 |
| 3,199,272 | 8/1965 | Oehlrich et al. | 55/261 |
| 3,254,478 | 6/1966 | Szego | 55/340 |
| 3,283,480 | 11/1966 | Szego | 209/144 |
| 4,149,861 | 4/1979 | Sogo et al. | 55/261 |

FOREIGN PATENT DOCUMENTS

| | | | |
|---|---|---|---|
| 2536360 | 2/1976 | Fed. Rep. of Germany | 55/261 |
| 613823 | 7/1978 | U.S.S.R. | 55/459 R |

*Primary Examiner*—David L. Lacey
*Attorney, Agent, or Firm*—Dennis P. Clarke

[57] ABSTRACT

Cyclone separator for separating solid particles from particle laden gas having an outlet pipe assembly which includes a pair of co-axial outlet pipes spaced radially apart from each other to form an annular passage therebetween. The passage is connected through a so-called aspiration effect or jet pump effect type of suction device to ports located around the outlet pipe assembly. The outermost portion of a spiral upward flow of gas in the outlet pipe assembly which includes a substantial part of the particles contained in the upward gas flow in the outlet pipe assembly is drawn into the passage between the outlet pipes without disturbance of the upward flow and returned back and discharged through the ports around the outlet pipe assembly into a separating chamber to disturb the outer surface of the outlet pipe assembly thereby to prevent formation of a boundary layer on the outer surface of the outlet pipe assembly. The inner pipe of the outlet pipes is connected to an outlet chamber so that only the central portion of the spiral upward gas flow containing a less amount of particles is exhausted.

6 Claims, 8 Drawing Figures

CYCLONE SEPARATOR

This invention relates to cyclone separators for separating solid particles from particle laden air or gases.

Conventional cyclone separators generally include a separating tower to which particle laden gas is introduced from an upper portion thereof tangentially and downwardly to form a spiral downward flow substantially along the inner wall surface of the separating tower. The spiral flow of gas is turned in its direction of flow in the vicinity of the bottom of the separating tower and is caused to flow spirally upwardly substantially along the vertical center portion thereof. In the course of the spiral downward movement of the gas, solid particles are separated from the spiral flow of gas under the influence of centrifugal force and accumulate at the bottom portion of the tower until they are taken out. Thus, the spiral upward flow of gas along the vertical center portion of the separating tower contains a less amount of solid particles. Therefore, the separating tower is provided at its upper portion with an outlet pipe disposed substantially co-axially with the tower so as to allow only the spiral upward flow to flow out of the tower. The outlet pipe is generally extended downwardly from the upper end of the separating tower for a certain distance to prevent the particle laden incoming flow from entering the outlet pipe.

In the conventional cyclone separators as mentioned above, however, fine particles cannot be perfectly separated in the course of the spiral downward movement of the gas flow so that the gas exhausted through the outlet pipe inevitably includes particles to some extent. The reason for this is considered to be: (1) it is difficult to perfectly separate extremely minute particles only by means of centrifugal force; and (2) a boundary layer is formed along the outer surface of the outlet pipe to substantially decrease the speed of the downward gas flow in the immediate vicinity of the outlet pipe. Thus, the particles in the vicinity of the outer surface of the outlet pipe are not entrained by the spiral downward flow of the incoming gas but are allowed to fall downwardly apart from the spiral downward flow and are then blown up by the spiral upward flow into the outlet pipe, thereby adversely increasing the particle content of the discharged gas.

In order to overcome the above problems, Japanese Utility Model Application Sho No. 49-98254 laid open for public inspection as Utility Model Public Disclosure Sho No. 51-25272 on Feb. 24, 1976 and applicants U.S. patent application Ser. No. 605005 titled "Cyclone Separator" filed on Aug. 15, 1975, now abandoned, disclose a cyclone separator in which an outlet pipe is constituted of a plurality of co-axial outlet pipe elements and means is provided for supplying spiral downward flow to the annular space between each pair of adjacent outlet pipe elements. The gas entering into the outlet pipe contains fine solid particles which have not been centrifugally separated in the course of the spiral downward movement of the particle laden gas, and the particle concentration in the outlet pipe is highest at the area along the inner surface of the outlet pipe and decreases toward the center portion of the outlet pipe. Thus, the spiral downward flow supplied through the space between each pair of adjacent outlet pipe elements serves to blow down the outermost portion of the spiral upward flow which includes a substantial part of the fine particles contained in the upward flow of gas, so as to return them to the separating tower. As a result, only the central portion of the spiral upward flow of gas which has a smaller particle concentration than a mean particle concentration of the overall spiral upward flow of gas is exhausted through the outlet pipe whereby the separation efficiency is increased.

The proposed arrangement has been successful in providing improved particle separation efficiency. However, it is disadvantageous in that it is difficult to blow down only the outermost portion of the spiral upward flow of gas without disturbing the spiral upward flow. If the spiral upward flow of gas is disturbed, a considerable amount of the fine particles in the outermost portion of the spiral upward flow is unavoidably entrained in the central portion of the upward flow to be exhausted through the outlet pipe, so that satisfactory particle separation efficiency cannot be achieved. Even without disturbance of the spiral upward flow of gas, it is impossible to perfectly avoid some portion of the outermost portion of the spiral upward flow which has been blown down by the downward flow from between each pair of adjacent outlet pipe elements being again entrained by the central portion of the spiral upward flow before they are blown down out of the outlet pipe. Thus, the separation efficiency is limited by these problems.

Therefore, an object of this invention is to provide a cyclone separator with further improved particle separation efficiency.

According to this invention, the above and other objects can be accomplished in a cyclone separator by providing an outlet pipe assembly constituted of at least two co-axial outlet pipes extending downwardly in an upper central portion of a separating chamber and spaced radially apart from each other to form an annular passage therebetween. The inner outlet pipe is connected to an outlet chamber. The annular passage formed between the inner and outer outlet pipes is connected through so-called aspiration effect or jet pump effect type of suction means to ports means provided around the outlet pipe assembly.

During the separation process in the cyclone separator, the outermost portion of the spiral upward flow of gas which has entered into the outlet pipe assembly is drawn into the passage between the outlet pipes and then returned back through the port means into a separating chamber. Since the outermost portion of the spiral upward flow of gas is drawn, the outermost portion of the spiral upward flow of gas which includes a substantial part of solid particles contained in the spiral upward gas flow in the outlet pipe assembly can be perfectly separated from the central portion of the upward flow having less amount of particles without disturbing the spiral upward flow, and then returned back through the port means into the separating chamber for another separation while disturbing the outer surface of the outlet pipe assembly to prevent formation of a boundary layer on the outer surface of the outlet pipe assembly. Therefore, the incoming gas of high particle concentration falling down in the boundary layer is made safe from being substantially entrained by the spiral upward flow at the inlet of the outlet pipe assembly without being subjected to the separating effect of the spiral downward flow. Furthermore, only the central portion of the spiral upward gas flow in the outlet pipe assembly which includes less amount of particles is perfectly separated and discharged through the inner outlet pipe and the outlet chamber without entraining the particles contained in the outermost portion of the upward gas flow. Accordingly, increased separation efficiency can be obtained as compared with the arrangement disclosed in the above mentioned applications.

According to one aspect of this invention, there is provided a cyclone separator comprising a separating tower defining a separating chamber therein, and inlet means for introducing particle laden gas into the separating chamber from an upper portion thereof in such a manner that the introduced gas forms a spiral downward flow along an inner wall surface of the separating tower and then it is turned in its direction of flow to form a spiral upward flow substantially along a center portion thereof. The cyclone separator also comprises an outlet pipe assembly located to extend downwardly in the upper central portion of the separating tower and constituted of at least two coaxial outlet pipes, one of which extends within the other outlet pipe spaced radially apart from the other outlet pipe to form an annular passage therebetween. Accelerating air supplying nozzle means is also provided around the outer outlet pipe to discharge accelerating air along the outer surface of the outer outlet pipe in the direction of the spiral downward flow. The annular passage formed between the outlet pipes communicates with the nozzle means with its connecting port directed in such a direction that when the accelerating air is injected through the nozzle means a suction force is created at the connecting port by so-called aspiration effect or jet pump effect caused by the flow of the accelerating air flowing before the connecting port.

With the above construction, the accelerating air flow discharge from the nozzle means along the outer surface of the outer outlet pipe acts not only to accelerate the spiral downward flow of the particle laden gas in the separating chamber so as to increase the centrifugal force of the spiral flow, but also to disturb the outer surface of the outer outlet pipe so as to perfectly prevent formation of a boundary layer. The suction force created in the annular passage between the inner and outer outlet pipes acts to, without disturbance of the spiral upward flow of gas, to draw and separate only the outermost portion of the spiral upward flow of gas in the outlet pipe assembly which is of a particle concentration much larger than that of the central portion of the upward flow, so as to return it back through the annular passage and the accelerating air nozzle means to the separating chamber. Therefore, only the central portion of the spiral upward flow which is of relatively small particle concentration is exhausted without entraining the outermost portion of the spiral upward flow. As a result, the particle separation efficiency is increased.

According to another aspect of this invention, instead of the accelerating air supplying nozzle means, suction port means are provided around the outer surface of the outer outlet pipe and are directed in such a direction that when the incoming gas spirally and downwardly flows before the port means a suction force is created at the port means by so-called aspiration effect or jet pump effect. The annular passage between the inner and outer outlet pipes is connected to the port means.

With this arrangement, the suction force acting in the annular passage will allow the outermost portion of the spiral upward flow in the outlet pipe assembly to be sucked and returned back through the passage between the outlet pipes and the port means to the separating chamber. In addition, the gas discharged from the port means is passed along the outer surface of the outlet pipe assembly to disturb the outer surface and to prevent formation of a boundary layer.

Furthermore, an expanding member may be located on the central axis of the outlet pipe assembly in the vicinity of the inlet or lower port of the outlet pipe assembly to enlarge the spiral radius of the spiral upward flow. This expanding member acts to cause the peripheral portion of the spiral upward flow to be entrained again by the spiral downward flow without allowing it to enter into the outlet pipe assembly. The expanding member also acts to facilitate entrance of the outermost portion of the gas spirally and upwardly flowing in the outlet pipe assembly into the passage between the inner and outer outlet pipes. Preferably, the expanding member is a circular cylinder having a conical portion at opposite ends thereof.

The above and other objects and features of this invention will become apparent from the following description of preferred embodiments with reference to the accompanying drawings, in which.

Figure 1:
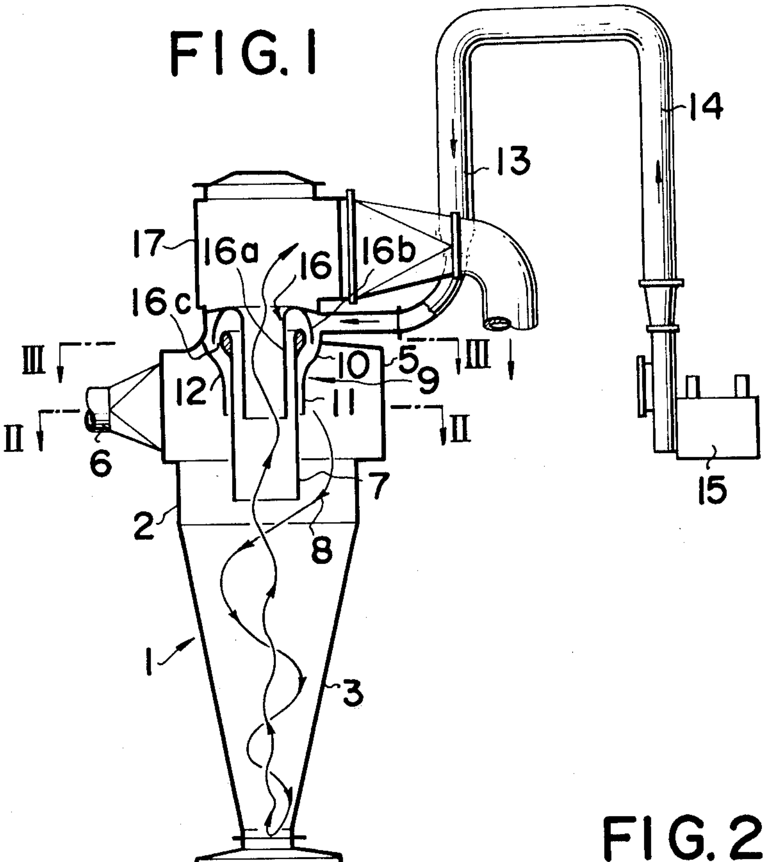
FIG. 1 is a vertical sectional view of one embodiment of the cyclone separator constructed in accordance with this invention.
Figure 2:
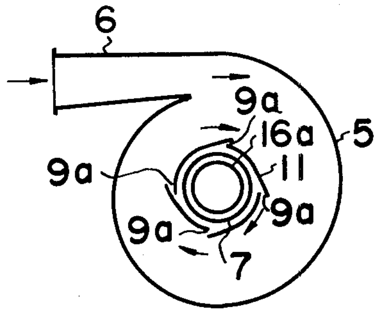
FIG. 2 is a sectional view taken substantially along the line II—II in FIG. 1.
Figure 3:
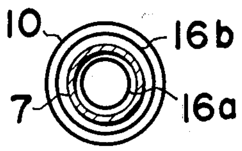
FIG. 3 is a sectional view taken substantially along the line III—III in FIG. 1.

Referring now to FIGS. 1 through 3, there is shown a cyclone separator in accordance with this invention which includes a separating tower 1 of substantially inverted frustoconical configuration having a cylindrical upper portion 2 and a conical lower portion 3 and defining a separating chamber therein. The lower end of the separating tower 1 is connected with a particle collecting chamber 4. At the upper end of the separating tower 1, there is provided an inlet chamber 5 which has an inlet passage 6 disposed tangentially of the inlet chamber 5 as shown in FIG. 2. There is also disposed a cylindrical outlet pipe 7 which extends downwardly and vertically through a central portion of the inlet chamber 5 near to a lower end of the cylindrical portion 2 of the separating tower 1.

As is well known in the art of cyclone separators, particle laden gas is introduced from the inlet passage 6 tangentially into the inlet chamber 5 and then is directed spirally downwardly along the inner wall surface of the separating tower 1 to form a spiral downward flow of gas as shown by arrows 8 in FIG. 1. At the lower portion of the separating tower 1, the flow of gas is turned upwardly to form a spiral upward flow along the center portion of the separating tower 1. At the upper portion of the separating tower 1, the spiral upward flow is introduced into the outlet pipe 7. During this process, the solid particles in the gas are separated from the gas under the influence of the centrifugal force of the spiral gas flow and fall down along the inner wall surface of the separating tower 1 to be collected in the particle collecting chamber 4.

In the above mentioned construction, according to this invention, accelerating air supplying nozzle means 9 is provided on the outer surface of the outlet pipe 7. The nozzle means 9 includes a circular cylindrical member 12 provided to co-axially surround the outlet pipe 7. The cylindrical member 12 has an enlarged upper portion 10 and a reduced lower portion 11. As seen from FIG. 2, the lower portion 11 has a plurality of vertical slots cut at equal intervals in the circumferential direction to form nozzle ports **9*a*. In the shown embodiment, four nozzle ports 9*a* are provided. A space defined between the outlet pipe 7 and the enlarged upper portion 10 of the cylindrical member 12 is connected at its upper portion through ducts 13 and 14 to a blower 15 so as to allow the nozzle ports 9*a*** to inject accelerating air.

As seen from FIG. 2, the nozzle ports **9*a* are directed to inject accelerating air in the same direction as the rotational direction of the spiral flow of the particle laden gas delivered from the inlet passage 6. Preferably, the nozzle ports 9*a*** are directed in a downwardly inclined direction to inject the accelerating air in the same direction as the spiral downward flow of gas.

Also according to this invention, there is provided an auxiliary outlet pipe 16 having an inner pipe portion **16*a* co-axially located in the outlet pipe 7 radially apart from the outlet pipe 7 to form an annular passage therebetween. The auxiliary outlet pipe 16 is connected at its upper portion to an outlet chamber 17, and the inner pipe portion 16*a* has its lower end terminating at a point upward from the lower end of the outlet pipe 7. These outlet pipe 7 and 16 constitute an outlet pipe assembly. The upper portion of the auxiliary outlet pipe 16 is bent outwardly above the upper end of the outlet pipe 7 and then is bent downwardly to have an enlarged folded cylindrical portion 16*b* extending downwardly in the space defined by the outer outlet pipe 7 and the enlarged upper portion 10 of the circular cylindrical member 12, so that the annular passage between the inner pipe portion 16*a* and the outer outlet pipe 7 communicates with the nozzle means 9. A connecting port 16*c* defined by the lower end of the folded portion 16*b* is directed in such a direction that when the accelerating air is injected through the nozzle means a suction force is created at the connecting port 16*c* by so-called aspiration effect or jet pump effect caused by the flow of the accelerating air flowing in the nozzle means, so as to generate an upward suction flow in the annular passage between the outer outlet pipe 7 and an inner pipe portion 16*a* of the auxiliary outlet pipe 16**.

With the above mentioned construction, pressurized air supplied from the blower 15 is discharged from the ports **9*a* of the nozzle means 9 along the outer surface of the outer outlet pipe 7. The discharged air from the nozzle ports 9*a* acts to accelerate the spiral downward flow of the particle laden gas introduced from the inlet passage 6** so as to increase the centrifugal separation effect of the spiral downward gas flow and also to disturb the outer surface of the outlet pipe assembly so as to perfectly prevent formation of a boundary layer which would otherwise be formed on the outer surface of the outlet pipe. Therefore, since the amount of solid particles falling down along the outer surface of the outlet pipe because of the boundary layer is greatly reduced, not only can substantially all particles contained in the incoming gas be entrained by the spiral downward flow of gas, but also the incoming gas of high particle concentration falling down in the boundary layer is prevented from being substantially entrained by the spiral upward flow of gas at the inlet of the outlet pipe assembly without being subjected to the separating effect of the spiral downward flow, thereby elevating the separating effect of the spiral flow up to the maximum limit.

Further, the outermost portion of the spiral upward flow of gas in the outlet pipe assembly which is of relatively high particle concentration because of the influence of centrifugal force is drawn into the annular passage between the outlet pipes 7 and **16*a* without disturbance of the spiral upward flow, and is then entrained by the upward suction flow in the annular passage to be returned back through the nozzle means 9 to the inlet chamber 5 for another separation of particles. Therefore, only the central portion, having less amount of particles, of the spiral upward flow of gas which has entered into the outlet pipe assembly is exhausted through the inner outlet pipe portion 16*a*** without entraining the outermost portion of the spiral upward gas flow in the outlet pipe assembly.

As seen from the above, the cyclone separator shown in FIGS. 1 through 3 achieves a higher separation efficiency than that obtained in the conventional devices disclosed in the applications as aforementioned.

Figure 4:
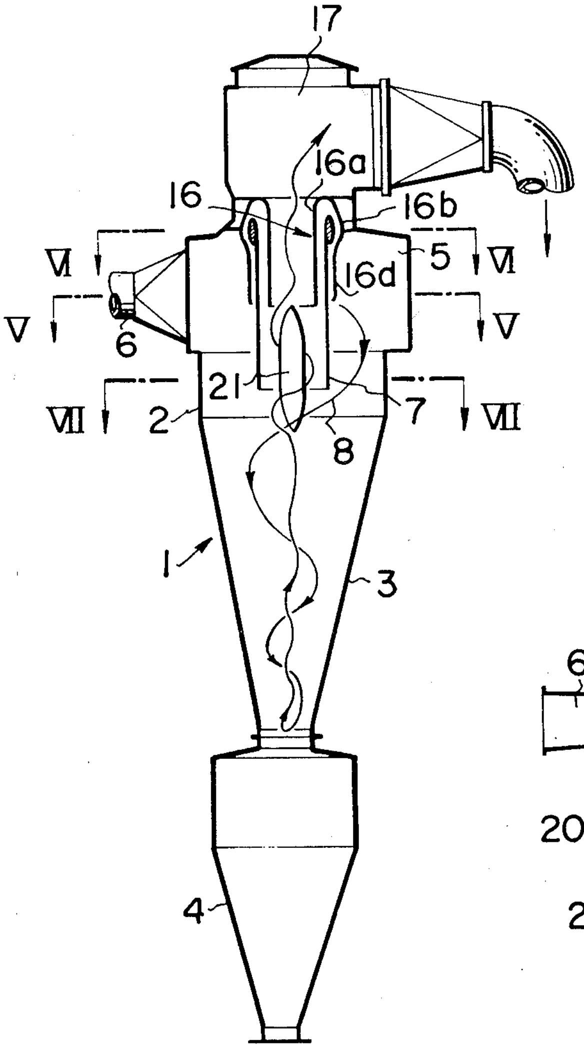
FIG. 4 is a vertical sectional view of another embodiment of the cyclone separator constructed in accordance with this invention.
Figure 5:
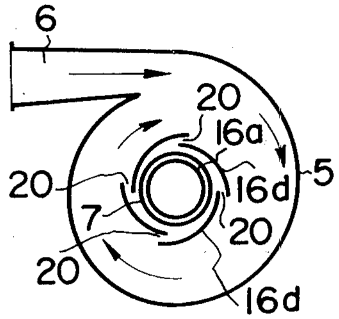
FIG. 5 is a sectional view taken substantially along the line V—V in FIG. 4.
Figure 6:
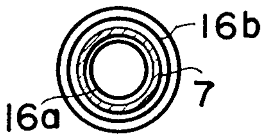
FIG. 6 is a sectional view taken substantially along the line VI—VI in FIG. 4.
Figure 7:
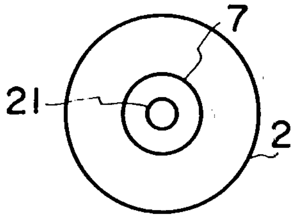
FIG. 7 is a sectional view taken substantially along the line VII—VII in FIG. 4.

Referring now to FIGS. 4 through 7, there is shown another cyclone separator according to this invention. The same portions of the cyclone separator shown in FIGS. 4 through 7 as those of the cyclone separator shown in FIGS. 1 through 3 are given the same reference numerals. In the embodiment shown in FIGS. 4 through 7, there is provided nothing corresponding to the accelerating air supplying nozzle means 9, the associated ducts 13 and 14, or the blower 15 in FIG. 1. Instead, the auxiliary outlet pipe 16 has a reduced cylindrical portion **16*d* extending downwardly from the enlarged folded portion 16*b* along the outer surface of the outlet pipe 7. As shown in FIG. 5, the reduced cylindrical portion 16*d* has a plurality of vertical slots 20 formed at equal intervals on the circumference of the portion 16*d*. For example, four slots are provided. These slots 20 are directed in such a direction that when the particle laden incoming gas spirally and downwardly flows before the slots 20 a suction force is created at the slots by so-called aspiration effect or jet pump effect to generate an upward suction flow in the annular space between the outlet pipe 7 and the inner pipe portion 16*a* of the auxiliary outlet pipe 16. For example, the slots 20 are directed to open in the same direction as the rotational direction of the spiral downward flow in the inlet chamber 5. Preferably, the slots 20 are directed in a downwardly inclined direction to open in the same direction as the spiral downward flow of gas. As seen from the above, since the slots 20 act to generate suction force in the annular passage between the outlet pipe 7 and the auxiliary outlet pipe 16**, they can be called "suction port means".

Furthermore, as shown in FIG. 4, an expanding member 21 is located on the axis of the outlet pipe assembly in the vicinity of the inlet or lower port of the outlet pipe assembly to enlarge the spiral radius of the spiral upward flow of gas. The expanding member 21 is preferably a circular cylinder having a conical portion at opposite ends thereof.

With the above mentioned arrangement, when particle laden air introduced from the inlet passage 6 through the inlet chamber flows before the slots 20 as the spiral downward flow, the suction force is created by the aspiration effect or jet pump effect at the slots 20 and hence in the annular passage between the outlet pipe 7 and the auxiliary outlet pipe 16. The suction force acts to allow the outermost portion of the spiral upward flow which has entered in the outlet pipe assembly to be drawn and returned back through the annular passage between the outlet pipes 7 and 16 and through the slots 20 to the inlet chamber 5 without disturbing the spiral upward flow of gas in the outlet pipe assembly. As a result, only the central portion of the spiral upward flow of gas which contains less amount of particles is exhausted through the outlet chamber 17, and the outermost portion of the spiral upward flow in the outlet pipe assembly including a substantial part of the particles contained in the spiral upward flow in the outlet pipe assembly is returned back to the inlet chamber for another separation. In addition, the gas returned through the slots 20 is passed along the outer surface of the outlet pipe assembly to disturb the outer surface thereby to prevent formation of a boundary layer.

Furthermore, the expanding member 21 acts to enlarge the spiral radius of the spiral upward flow of gas before the inlet port of the outlet pipe assembly, thereby to cause the peripheral portion of the upward flow to be entrained again by the spiral downward flow without allowing it to enter the outlet pipe assembly. Therefore, the outermost portion of the spiral upward flow of gas having relatively high particle concentration is returned back to and entrained by the spiral downward flow before it enters into the outlet pipe assembly. In addition, the expanding member 21 also acts to facilitate entrance of the outermost portion of the spiral upward flow in the outlet pipe assembly into the annular passage between the outlet pipes 7 and 16.

As seen from the above, in the cyclone separator shown in FIGS. 4 through 7, since formation of the boundary layer is prevented and since the outermost portion of relatively high particle concentration of the spiral upward gas flow is twice separated and returned back to the separating tower so that only the central portion of extremely low particle concentration of the spiral upward gas flow is exhausted, separation efficiency is greatly increased. In other words, similar effect to that obtained in the cyclone separator shown in FIGS. 1 through 3 can be obtained with a simpler construction.

Figure 8:
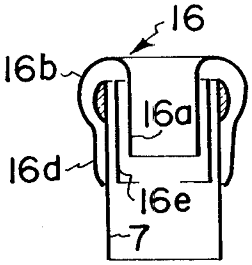
FIG. 8 is a partial vertical sectional view showing a modification of the outlet pipe assembly of the cyclone separator shown in FIG. 4.

In the embodiment shown in FIGS. 4 through 7, as shown in FIG. 8, the outlet pipe assembly may have a second auxiliary outlet pipe 16*e* provided between the outlet pipe 7 and the inner pipe portion 16*a* of the first auxiliary outlet pipe 16. This can be also said of the cyclone separator shown in FIGS. 1 through 3. In addition, the expanding member 21 may be located in the cyclone separator shown in FIGS. 1 through 3.

This invention has thus been shown and described with reference to specific embodiments. However, it should be noted that the invention is in no way limited to the details of the illustrated structures but changes and modifications may be made without departing from the scope of the appended claims.

We claim:

1. A cyclone separator comprising a separating tower defining a separating chamber therein, inlet means for introducing particle laden gas into the separating chamber at an upper portion thereof in such a manner that the introduced gas forms a spiral downward flow along an inner wall surface of the separating tower and then it is turned in its direction of flow to form a spiral upward flow substantially along a center portion thereof, and outlet pipe means disposed in the upper portion of the separating chamber for allowing the spiral upward flow of gas to pass therethrough, comprising at least two co-axial outlet pipes radially separated from each other and disposed to form an annular passage therebetween, the innermost outlet pipe of the at least two outlet pipes extending upwardly and then outwardly and downwardly to surround the upper portion of the outermost outlet pipe of the outlet pipes and the portion of said innermost outlet pipe which surrounds said outermost outlet pipe having suction port means which communicates with the annular passage between each pair of adjacent outlet pipes and which is in flow communication with the inflowing particulate laden gas so that the outermost portion of the spiral upward flow which has entered into the outlet pipe means is drawn into said annular passage and returned back through said port means to said separating chamber while disturbing the outer surfaces of said outlet pipe means.

2. A cyclone separator set forth in claim 1 in which an expanding member is located on the central axis of said outlet pipe means in the vicinity of said outlet pipe means to enlarge the spiral radius of the spiral upward gas flow.

3. A cyclone separator set forth in claim 1 in which said port means includes a plurality of ports provided at equal intervals on the circumference of said outlet pipe means and directed in the rotational direction of the spiral downward flow of gas.

4. A cyclone separator set forth in claim 3 in which an expanding member is located on the central axis of said outlet pipe means in the vicinity of said outlet pipe means to enlarge the spiral radius of the spiral upward gas flow.

5. A cyclone separator comprising a separating tower defining a separating chamber therein, inlet means for introducing particle laden gas into the separating chamber at an upper portion thereof in such a manner that the introduced gas forms a spiral downward flow along an inner wall surface of the separating tower and then it is turned in its direction of flow to form a spiral upward flow substantially along a center portion thereof, and outlet pipe means disposed in the upper portion of the separating chamber for allowing the spiral upward flow of gas to pass therethrough, comprising at least two co-axial outlet pipes radially separated from each other and disposed to form an annular passage therebetween, the innermost outlet pipe of the at least two outlet pipes extending upwardly and then outwardly and downwardly to surround the upper portion of the outermost at least two outlet pipe of the outlet pipes and to form between its lower end and said outermost outlet pipe a port which communicates with the annular passage between each pair of adjacent outlet pipes and which is adapted to be subjected to a suction force when a stream of fluid flows before said port, accelerating gas discharging means located on the upper outer surface of said outermost outlet pipe, and connected to a pressurized gas supplying means to discharge accelerating gas along the outer surface of said outermost outlet pipe, said outer lower end of said innermost outlet pipe extending into said accelerating gas discharging means so that when the accelerating air is injected through said accelerating air discharging means a suction force is created at said port by aspiration effect and the outermost portion of the spiral upward flow which has entered into the outlet pipe means is drawn into said annular passage and returned back through said port to said separating chamber while disturbing the outer surface of said outlet pipe means.

6. A cyclone separator set forth in claim 5 in which said accelerating air discharging means includes a plurality of nozzles provided at equal intervals on the circumference of said outlet pipe means and directed in the rotational direction of the spiral downward flow of gas.

* * * * *